United States Patent Office 2,796,970
Patented June 25, 1957

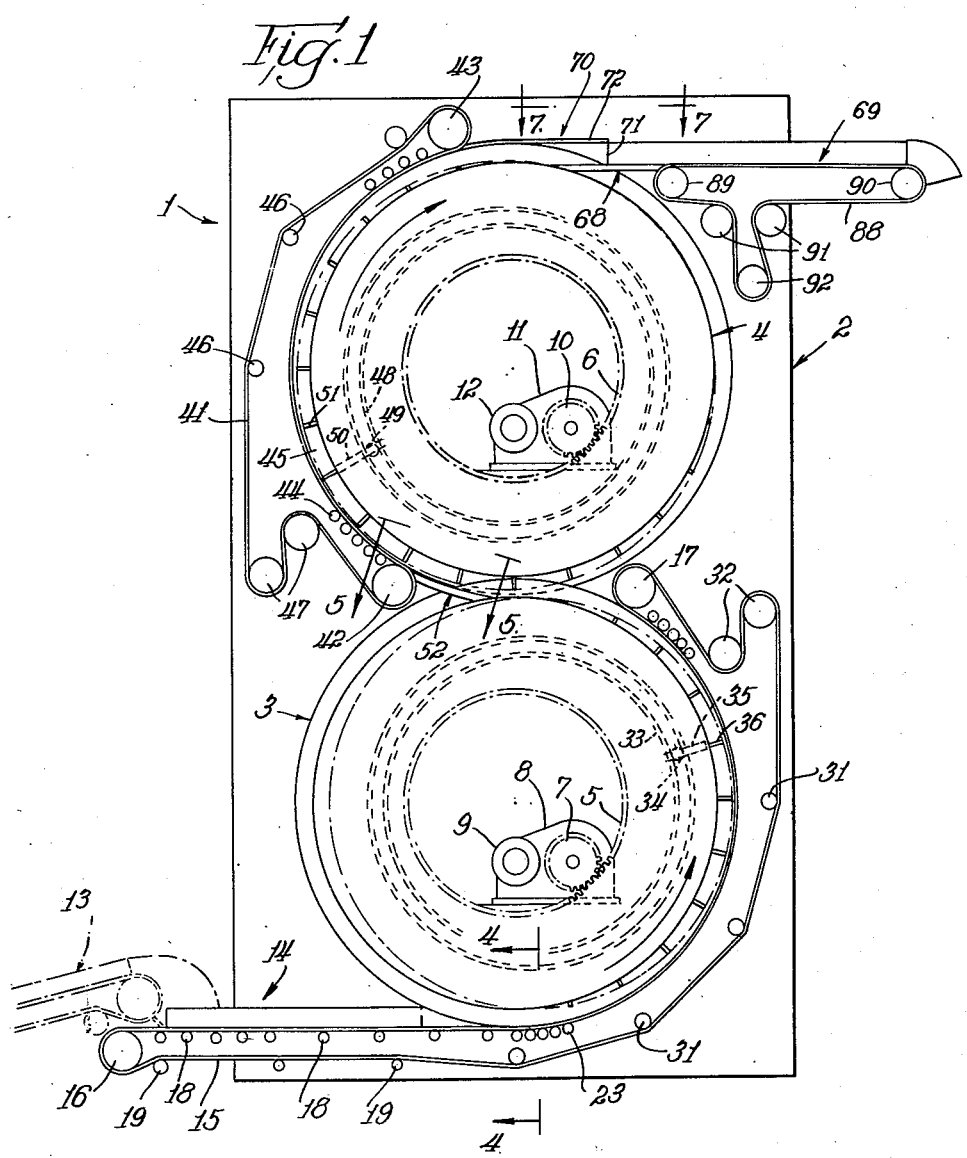

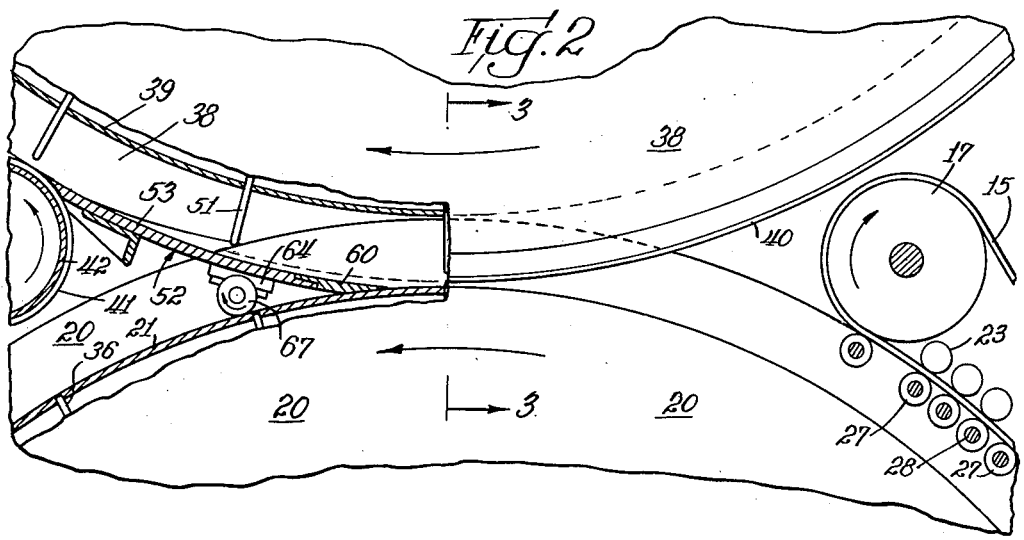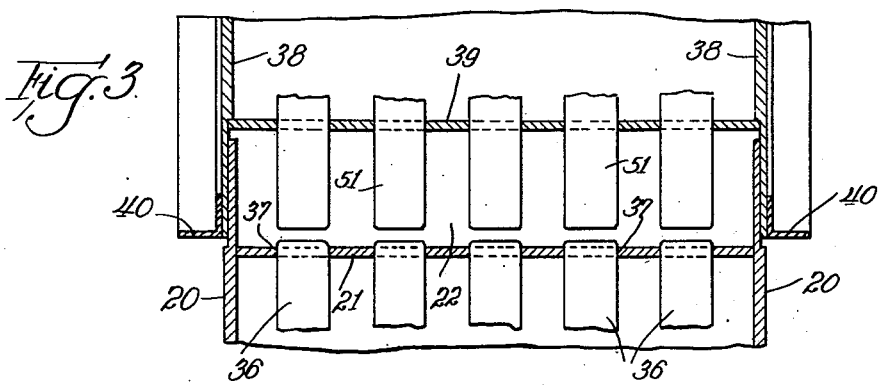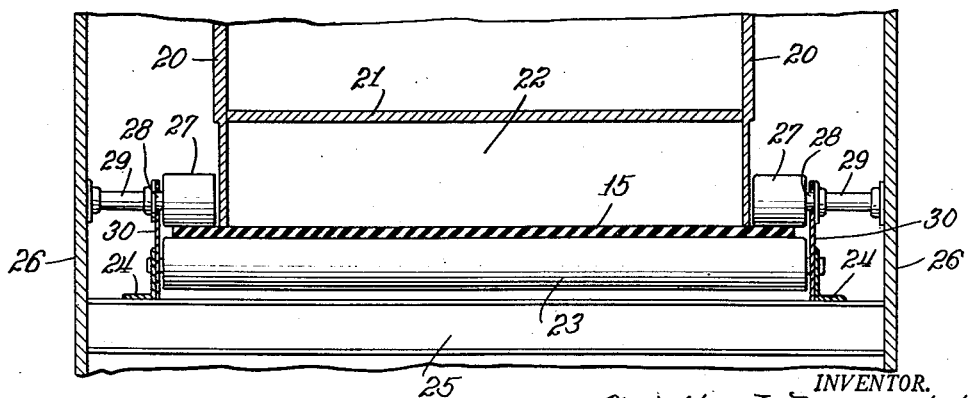

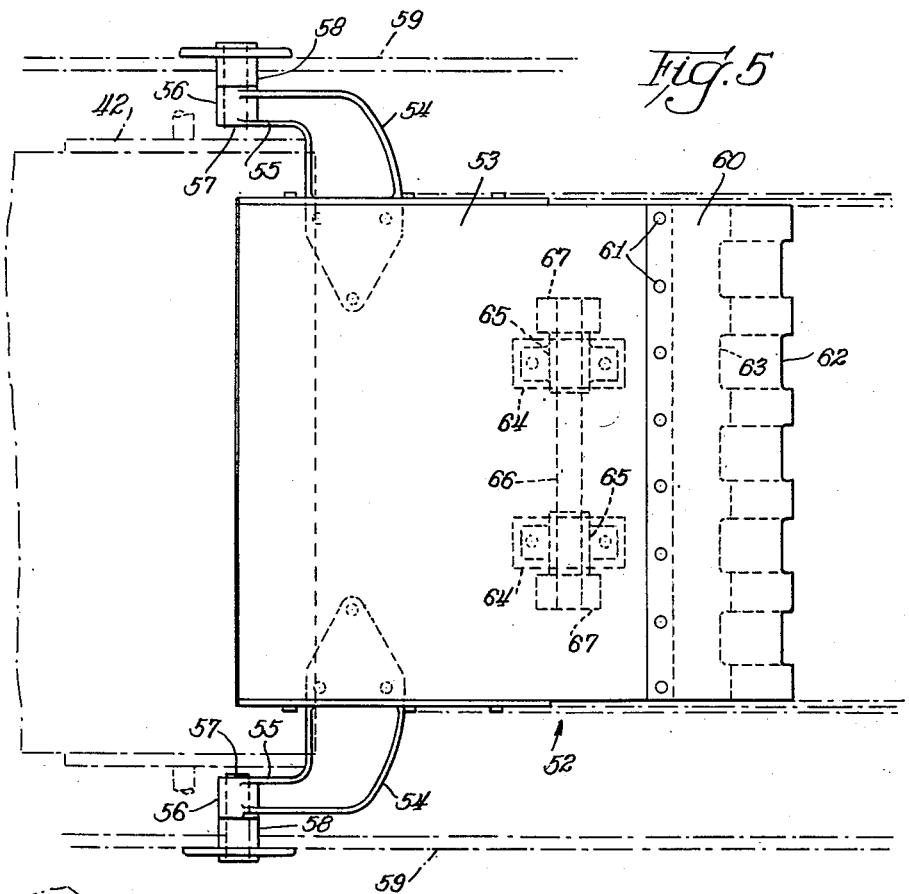
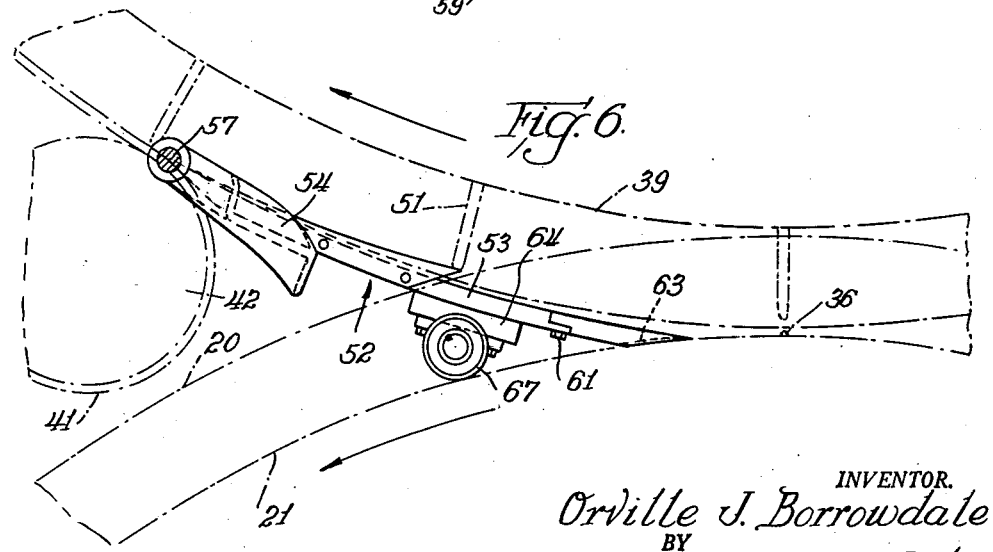
INVENTOR.
Orville J. Borrowdale
BY
Gary Desmond & Parker
Attys.

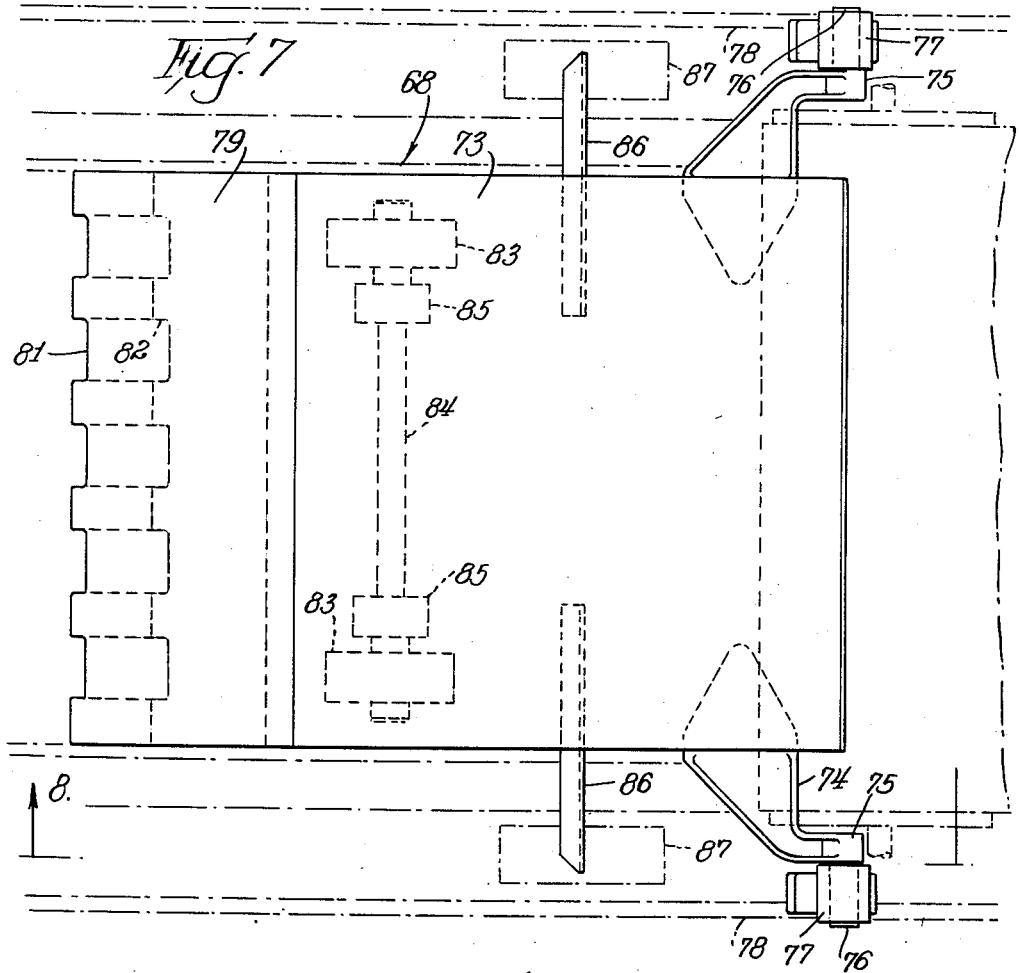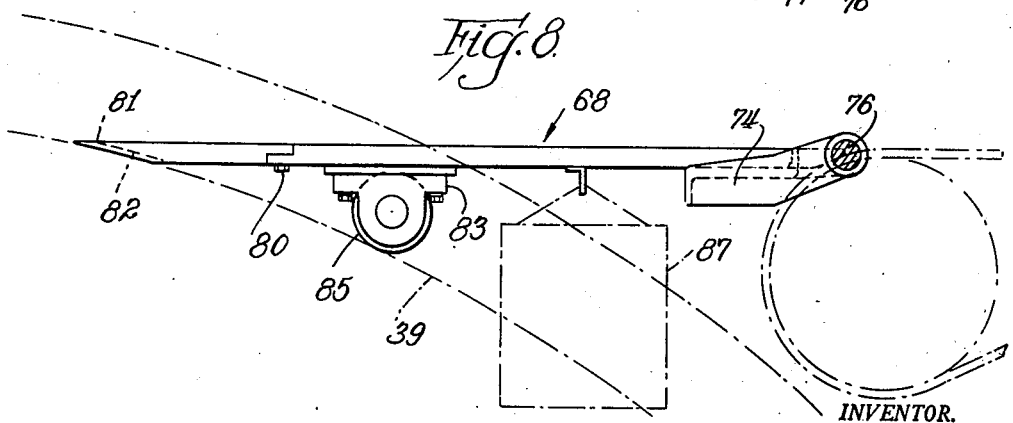

2,796,970

MULTIPLE ELEVATOR CONVEYOR EMPLOYING RADIALLY MOVABLE PROJECTIONS

Orville J. Borrowdale, Chicago, Ill.

Application May 11, 1953, Serial No. 353,938

11 Claims. (Cl. 198—102)

This invention relates to improvements in an elevator-conveyor and refers particularly to a device for conveying material from one level to a higher level, that is, elevating the material wherein the effective lift of the material is comparatively great relative to the total distance traversed by the material in being elevated.

In my copending applications for patent, Serial Nos. 353,934 and 353,935, respectively, both filed May 11, 1953, an elevator conveyor mechanism is described wherein material to be elevated or conveyed from one elevation to a higher elevation is fed to an arcuate zone defined by a rotating frame or drum and a radially spaced endless belt, the material being raised by said belt and said drum surface in said zone, the device being characterized in that radially movable projecting members or blades extend into said arcuate zone and inhibit the retrogressive movement of the material during the period that it is being elevated.

The present invention employs certain of the basic concepts of the above described copending applications, and primarily relates to a mechanism wherein the material to be elevated is lifted in a plurality of stages, each stage embodying concepts of the basic principle of providing an arcuate zone into which radially movable projecting members extend to prevent retrogressive movement of the material in each stage.

The present invention also contemplates means for transferring the elevated material from a lower stage to the next higher stage and also means for transferring material from the uppermost stage to a conveyor.

The objects and advantages of the present invention will be apparent from the accompanying drawings and following detailed description.

In the drawings, Fig. 1 is a diagrammatic elevational view of an elevator-conveyor embodying the concepts of the present invention.

Fig. 2 is an enlarged fragmentary detailed view of that portion of Fig. 1 where the stages are tangential to each other.

Fig. 3 is a sectional view taken on line 3—3 of Fig. 2.

Fig. 4 is an enlarged sectional view taken on line 4—4 of Fig. 1.

Fig. 5 is an enlarged detailed sectional view taken on line 5—5 of Fig. 1 illustrating the transfer plate between adjacent stages.

Fig. 6 is a side elevational view of the parts shown in Fig. 5.

Fig. 7 is an enlarged detailed plan view looking in the direction of arrows 7—7 of Fig. 1.

Fig. 8 is a side elevational view looking in the direction of the arrows 8—8 in Fig. 7.

Referring in detail to the drawings, and with specific reference to Fig. 1 thereof, 1 indicates diagrammatically an elevator-conveyor comprising an embodiment of the present invention. The device 1 comprises a stationary frame structure, diagrammatically illustrated at 2 and two relatively rotatable frame structures 3 and 4, comprising respectively a lower and upper stage of a multiple stage elevator-conveyor. For purposes of illustration of the invention two stages are shown, but it is to be understood that two or more stages may be employed and the same principles and duplication of structure would apply where more than two stages are employed.

For further purposes of illustration each rotatable frame structure 3 and 4 is shown as being separately driven, but, if desired, the structures may be rotated from a single source of power (not shown). In the embodiment illustrated rotatable frame 3 may carry an internal ring gear 5 and frame 4 may carry a similar ring gear 6. Ring gear 5 meshes with a driving gear 7 which comprises the output of a conventional gear reducer 8, the input of which may be driven by an electric motor 9. Similarly, ring gear 6 meshes with a driving gear 10 comprising the output of gear reducer 11 which, in turn, is driven by electric motor 12. The motors 9 and 12 and the gear reducers 8 and 11 are all mounted upon portions of the stationary frame 2. Hence, rotatable frames 3 and 4 may be rotated upon the stationary frame 2, said frames being rotated at the same speed or, if desired, said frames, being separately driven may be driven at different speeds. As shown in detail in the copending applications for patent, hereinbefore described, the frames 3 and 4 may be each mounted upon suitable ring bearing assemblies (not shown herein).

The function of the device 1 is to elevate or lift material, which may be fed to the lower portion of the lower stage, to the upper portion of the uppermost stage wherein said material may be discharged or carried away to storage. To charge material to the device the discharge end of a conventional belt conveyor, indicated in broken lines at 13 in Fig. 1, may be positioned over the upper pass of a feed conveyor 14, comprising a portion of the device 1.

The feed conveyor 14 comprises an endless belt 15, which may be of conventional conveyor belt construction, such as, a rubber belt, steel belt, link belt or the like, said belt being trained around terminal rolls 16 and 17. The feed end of the conveyor 14 may be arranged with the upper pass thereof substantially horizontal, said upper pass being supported by rolls 18, and the lower pass of the belt at the feed end may be guided by suitable guide rolls 19.

The rotating frame 3 may be substantially cylindrical in shape and comprises spaced circular or annular side plates 20 (Figs. 2, 3 and 4). A drum plate 21, which defines the lateral walls of a cylinder, extends between the spaced plates 20 and said drum plate is spaced radially inwardly from the peripheral edges of the side plates. Thus an annular space 22 is defined on three sides by the opposite side plates 20 and the drum plate 21.

As the upper pass of the belt 15 moves toward the frame 3 it moves tangentially to the peripheral edges of the side plates 20. As will be hereinafter more fully described, the upper pass of the belt thereafter moves arcuately upwardly with the rotating frame 3, riding upon the peripheral edges of the plates 20. The belt 15 may be driven in timed relationship with the peripheral movement of the frame by its frictional contact with the edges of the plates 20, or, if desired, the belt 15 may be separately driven by suitable driving means (not shown). If the belt 15 is separately driven, it is preferred that its surface speed be substantially the same as the peripheral speed of the peripheral edges of the side plates 20 so that there will be no relative movement between the belt and the edges of the side plates 20.

As a support for the upper pass of the belt 15 during its arcuate travel with the periphery of the rotating frame 3, a plurality of relatively closely spaced rollers 23 are employed. The rollers 23 are freely rotatable and are journaled in opposite brackets 24 which in turn are supported by transverse beams 25 which, in turn, are carried by spaced side plates 26 which comprise a portion of the stationary frame 1. The brackets 24 define an arc which is concentric with the arc traversed by the periphery of the rotating frame and the beams 25 are spaced circumferentially from each other throughout the arcuate pass of the belt.

It will be noted that the width of the belt 15 is greater than the width of the rotatable frame 3 and hence is greater than the spacing between the side plates 20 whereby the upper pass of the belt 15 functions as a closure for the fourth side of the space 22 which is otherwise defined by the side plates 20 and the drum plate 21. Disposed on the opposite side of the side edges of the belt 15, outwardly from each of the side plates 20, are a plurality of rollers 27, each of said rollers being carried by a shaft 28 which is journaled in a sleeve 29, said sleeves being carried by the inner faces of the side plates 26 of the stationary frame 2. Brace members 30 carried by brackets 24 function to support the inner ends of the sleeves 29.

The belt 15 after completing its arcuate travel with the upwardly moving portion of the rotatable frame 3 returns over the terminal roll 17 and is guided by guide rolls 31 on its return pass to the terminal roll 16. A conventional belt tightening arrangement comprising rolls 32 may be employed to keep the belt 15 at the proper tension.

It can readily be seen that as the rotatable frame 3 moves, the belt 15 moving therewith, material carried upon the upper pass of the belt 15 which has been charged thereto by conveyor 13 enters the arcuate space 22 and is carried upwardly through said space by the belt. As the upper pass of belt 15 moves from its lowermost tangential position with respect to the rotatable frame 3, said belt moving in the arcuate path climbs rapidly and consequently the material carried by said belt would tend to slip rearwardly, that is, the material would tend to retrogress in the space 22. As is described in detail in the copending applications for patent hereinbefore identified, means is provided for inhibiting this retrogressive movement of the material during its upward climb with belt 15.

The means contemplated for the inhibition of the retrogressive movement of the material comprises a pair of spaced cam tracks 33 which are carried by the stationary frame 2. The cam tracks 33 are illustrated as being eccentric with respect to the rotatable frame 3 and the greatest degree of eccentricity of said cam tracks occurs adjacent the upwardly moving side of the rotatable frame. A cam follower 34 rides in said cam tracks and is connected to a member 35 which carries a plurality of projections 36. The cam follower 34, member 35 and the projections 36 are carried by the rotatable frame and consequently moves circularly with said frame. It can readily be seen that as these elements move with the rotatable frame, the eccentric cam track causes the projections 36 to move radially inwardly and outwardly, the outward movement occurring adjacent the upwardly moving side of the rotatable frame 3.

Referring particularly to Fig. 3 it will be noted that the projections 36 carried by the members 35 extend through openings 37 provided in the drum plate 21. Consequently, at the upwardly moving side of the frame 3 the eccentric cam tracks 33 cause the blades 36 to move inwardly into the space 22. In this fashion the projections or blades 36 function as partitions or baffling means to inhibit the rearward sliding or retrogressive movement of the material being carried upon the arcuate pass of the belt 15.

The eccentricity of the cam tracks 33 is such that the projections or blades 36 tend to move into the space 22 adjacent the point of tangency of the upper pass of the conveyor belt 15 from its feed end. As the arc of travel moves upwardly, the projections or plates 36 move further inwardly into the space 22 and said projections penetrate the mass of material which is carried within the space 22 upon the belt 15. After the point of major eccentricity is reached, the projections or blades 36 are retracted by the cam tracks 33 and hence said blades tend to move radially inwardly, out of the space 22. At approximately the uppermost portion of travel of the rotating frame 3, the blades or projections 36 are completely retracted from the space 22.

Although circumferentially spaced projections 36 are shown and described as being actuated by an eccentric cam track, it is to be understood that the cam track may be of any desired configuration which will perform the function intended to be performed by the projections or, if desired, the projections or blades may be actuated to move inwardly and outwardly with respect to the space 22 by means of motors which may be carried upon the rotatable frame 3. These various constructions are set forth in detail in applicant's copending applications hereinbefore identified.

The rotating frame 4 is positioned immediately above frame 3 and comprises essentially the second stage of the device 2. The rotatable frame 4 is somewhat similar to frame 3, having spaced side plates 38 and a substantially cylindrical drum plate 39 (Fig. 3). Disposed upon the outer surfaces of the side plates 38 are angle-sectioned annular flanges 40, the purpose of which will be hereinafter more fully described. The two frames 3 and 4 are disposed substantially tangent to each other and adjacent the zone of tangency the peripheral portions of side plates 20 overlap similar portions of the side plates 38. Thus, adjacent the zone of tangency the space 22 merges with a similar space defined by the edge portions of plates 38 and the drum plate 39, as shown best in Fig. 3. As will be hereinafter more fully described, the material elevated by the lower stage in the space 22 is delivered, adjacent the zone of tangency between the two rotating frames, to the corresponding space defined by the side plates 38 and the drum plate 39 of the upper rotatable frame.

An intermediate flexible belt 41 is trained around terminal rolls 42 and 43 and a pass of said belt adjacent the upwardly moving side of the rotatable frame 4 passes between the annular flanges 40 and a plurality of arcuately disposed rollers 44 which latter are similar to rollers 23 and are rotatably mounted upon the stationary frame 2. Hence, an arcuate space 45 is completely closed by the peripheral portions of the side plates 38, the drum plate 39 and one pass of the belt 41. Belt 41 on its return pass is guided by guide rolls 46 and is maintained in desired taut condition by conventional belt-tightener rolls 47. Belt 41 may be driven by frame 4 or may be separately driven by any conventional means (not shown) preferably at a surface speed substantially equal to the peripheral speed of flanges 40.

Eccentric cam tracks 48 may be carried by the stationary frame 2 and a plurality of cam-followers 49 may be operably positioned between said tracks. Each pair of cam-followers 49 may be connected to a member 50, all of which are mounted upon the rotatable frame 4, and each pair of members 50 carry one or more projections or blades 51. The members 50 are circumferentially spaced from each other, and by virtue of the eccentricity of the cam tracks 48, said projections or blades 51 are moved radially inwardly and outwardly. The preferred position of the maximum degree of eccentricity of the cam tracks 48 with respect to the center of rotation of frame 4 is such that the projections or blades 51 will move into the space 45 before the zone of tangency is reached, that is, the maximum extension of the projections will occur at a position slightly advanced angularly in a clockwise direction from the zone of tangency between the two rotatable frames. Thus, at the zone of tangency, although projections 36 will be withdrawn, the projections 51 will be extended to a substantial extent and will assist in moving the material being conveyed past the zone of tangency.

After the material elevated through the space 45 is transferred to the dead plate 68 it is moved therefrom to the upper pass of the discharge conveyor 69. The conveyor 69 comprises an endless conveyor belt 88 which is trained around terminal rolls 89 and 90. On the return pass the belt 88 is wrapped around guide rolls 91 and belt-tightener rolls 92. Conveyor 69 may be a conventional endless belt conveyor.

It is to be understood that, although two flights or stages of elevating are shown and described herein, two or more flights or stages may be used, the transfer of the material from the second or third flight to the next higher stage or flight being accomplished in the manner hereinbefore described in transferring the material from the first to the second stages.

It will be noted that adjacent the zone of tangency between the rotating frames 3 and 4 the material which had been raised in the space 22 is carried substantially entirely upon the drum plate 21. As the point of tangency is passed, it is desired that said material be moved into the arcuate space 45 provided at the periphery of the rotating frame 4. Hence, the material must be raised from the surface of the drum plate 21 and conveyed to a position adjacent the terminal roll 42. Of course, when the material has been positioned above the terminal roll 42 it will thereafter be carried by the arcuate pass of the belt 41. To transfer the material from the surface of the drum plate 21 to the arcuate pass of the belt 41 a dead plate or transfer plate 52 is employed, said plate extending essentially from the zone of tangency to the upper portion of the terminal roll 42.

Referring particularly to Figs. 5 and 6, enlarged views of the dead plate or transfer plate 52 are shown. The transfer plate 52 comprises a plate 53 of relatively large area, said plate having secured thereto opposite brackets 54 which are fastened to the plate 53 adjacent one end thereof. The brackets 54 terminate in arms 55 which carry bosses 56. A pin 57 is secured in each boss and extends outwardly into a bearing member 58, said opposite bearing members being carried by frame members 59 which comprise a portion of the stationary frame 2. In this fashion the plate 53 is swingable about the bearings 58.

At the opposite end of the plate 53 a removable extension 60 is secured to the plate by means of bolts or the like 61. The forward edge of the removable extension 60 is tapered to conform substantially with the curvature of the drum plate 21, the forward edge being scalloped, as shown best at 62 and also is cut away as indicated at 63 in Figs. 5 and 6.

A pair of brackets 64 are mounted upon the lower face of the plate 53, each of said brackets carrying a bearing 65. A shaft 66 is journaled in the spaced bearings 65 and at each end of the shaft a roller 67 is carried. In operation, the rollers 67 rest upon the drum plate 21 and the arrangement is such that when said rollers are in supported position upon the drum plate 21 the tapered edge portion of the extension 60 rides in snug relationship upon the surface of the drum plate 21.

In view of the fact that the extension 60 will be subjected to considerable wear and abrasion, it is made removable from the plate 53 whereby it may be replaced when the wear becomes excessive. In addition, by virtue of the scalloped portions 62 the extension 60 functions more efficiently to divert the material carried upon the drum plate 21 and cause said material to move over the surface of the plate 53.

As has been hereinbefore described the projections 36 are substantially completely withdrawn from the space 22 when the point of tangency is reached whereby they will not engage the scraping edge of the extension 60. However, in view of the fact that the material being transferred from the drum plate 21 to the upper pass of the belt 41 is disposed on a relatively stationary surface, that is, the surfaces of the extension 60 and plate 53, said material must be positively moved over the transfer plate. To accomplish this positive movement of the material, the eccentricity of the cam tracks 48 is such that the projections 51 are substantially extended radially outwardly to their maximum position as they pass over the transfer plate. In this fashion the material being transferred from the space 22 to the space 45 is moved substantially entirely through the agency of the projected extensions 51.

The eccentricity of the cam tracks 48 is such that the material carried in the arcuate space 45 is inhibited from retrogressive movement in said space. As the material completes its upward journey, the projections or blades 51 retract and are substantially completely retracted at the uppermost position of the drum plate 39. Adjacent the uppermost position of the drum plate 39 a second transfer plate 68 is disposed, said transfer plate functioning to support the material being discharged from the space 45 and being transferred to a discharge conveyor 69. Adjacent the uppermost position of the drum plate 39 a conduit 70 is positioned, said conduit being hollow and of a section substantially the same as the cross section of the space 45 and being defined by side walls 71, a top 72, and being defined at its lower portion by drum plate 39 and also by transfer plate 68. Thus, the material carried through the space 45 is urged into and through the conduit 70, that is, the material is pushed through said conduit onto the transfer plate 68.

Referring particularly to Figs. 7 and 8, enlarged views of the transfer plate 68 are shown. The transfer plate 68 is somewhat similar to transfer plate 52 and comprises a plate-like element 73 of relatively large area. The plate 73 adjacent its forward edge carries brackets 74 which terminate in bosses 75 which, in turn, carry pins 76. The pins extend outwardly into bearings 77 and are rotatable in said bearings, the bearings being carried by frame members 78 comprising a portion of the stationary frame 2. Thus, the plate 73 is swingable about bearings 77. At the trailing edge of the plate 73 an extension 79 is removably secured to said plates by means of bolts 80. The trailing edge of the extension 79 is tapered to conform with the curvature of the drum plate 39 and is provided with scallops 81 and cut away portions 82 to more efficiently divert or scrape the material carried upon the drum plate 39. Spaced bearings 83 are mounted upon the lower face of the plate 73 and support a shaft 84 which carries at its opposite ends rollers 84, said rollers being adapted to ride upon the surface of the drum plate 39. Supporting brackets 86 extend from opposite sides of the plate 73 and are adapted to carry weights 87 which hang from said supporting brackets. By means of the weights 87 the rollers 85 are maintained in contact with the drum plate 39 and when said rollers are in this position the tapered portion of the extension 79 rides in snug relationship upon the surface of the drum plate 39 whereby the material is diverted from the surface of the drum plate 39 to the surface of the transfer plate 68.

It is apparent that herein is provided a mechanism which can elevate material at a relatively rapid rate and wherein the effective lift of the material is comparatively great relative to the total distance the material is carried by the device.

I claim as my invention:

1. An elevator-conveyor comprising a relatively stationary frame, a plurality of rotatable frames rotatably mounted upon said stationary frame in substantially vertically aligned superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotatable frame an arcuate compartment in which material to be elevated and conveyed is carried, means carried by each rotatable frame and movable radially into said respective arcuate compartments to inhibit retrogressive movement of the material carried in said compartments, and means for transferring material from the compartment of a lower frame to the compartment of an adjacent upper frame whereby the material in said compartments is lifted in stages.

2. An elevator-conveyor comprising a relatively stationary frame, a plurality of rotatable frames rotatably mounted upon said stationary frame in substantially vertically aligned superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotatable frame an arcuate compartment in which material to be elevated and conveyed is carried, a plurality of circumferentially spaced projecting means carried by each rotatable frame and movable radially into said respective arcuate compartments to inhibit retrogressive movement of the material carried in said compartments, and means for transferring material from the compartment of a lower frame to the compartment of an adjacent upper frame whereby the material in said compartments is lifted in stages.

3. An elevator-conveyor comprising a relatively stationary frame, a plurality of rotatable frames rotatably mounted upon said stationary frame in substantially superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotatable frame an arcuate compartment in which material to be elevated and conveyed is carried, a plurality of spaced projecting means carried by each rotatable frame, means for moving said projecting means relative to the defining walls of said arcuate compartments and into said arcuate compartments to inhibit retrogressive movement of said material in said compartments, and means for transferring material from the compartment of a lower frame to the compartment of an adjacent upper frame whereby the material in said compartments is lifted in stages.

4. An elevator-conveyor comprising a relatively stationary frame, a plurality of rotatable frames rotatably mounted upon said stationary frame in substantially superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotatable frame an arcuate compartment in which material to be elevated and conveyed is carried, a plurality of spaced projecting means carried by each rotatable frame, means for moving said projecting means radially into said arcuate compartments to inhibit retrogressive movement of said material in said compartments, and means for transferring material from the compartment of a lower frame to the compartment of an adjacent upper frame whereby the material in said compartments is lifted in stages.

5. An elevator-conveyor comprising a relatively stationary frame, a plurality of rotatable frames rotatably mounted upon said stationary frame in substantially vertically aligned superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotatable frame an arcuate compartment in which material to be elevated and conveyed is carried, a plurality of spaced projecting means carried by each rotatable frame, means carried by said stationary frame for moving said projecting means relative to the respective peripheries of said rotatable frames and into said arcuate compartments to inhibit retrogressive movement of said material in said compartments, and means for transferring material from the compartment of a lower frame to the compartment of an adjacent upper frame whereby the material in said compartments is lifted in stages.

6. An elevator-conveyor comprising a relatively stationary frame, a plurality of rotatable frames rotatably mounted upon said stationary frame in substantially vertically aligned superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames each of said belt means being spaced radially from a portion of the periphery of a respective rotatable frame to provide with said portion of the rotatable frame an arcuate compartment in which material to be elevated and conveyed is carried, relatively flat blades carried by each rotatable frame and movable relative to the peripheries of the respective rotatable frames into said respective arcuate compartments to inhibit retrogressive movement of the material carried in said compartments, and a transfer plate over which material from the compartment of a lower frame is transferred to the compartment of an adjacent upper frame where the material in said compartments is lifted in stages.

7. An elevator-conveyor comprising a relatively stationary frame, a plurality of rotatable frames rotatably mounted upon said stationary frame in substantially superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotable frame an arcuate compartment in which material to be elevated and conveyed is carried, projections carried by each rotatable frame and movable into said respective arcuate compartments to inhibit retrogressive movement of the material carried in said compartments, means for moving said projections into said compartments comprising cam tracks mounted on said stationary frame, cam followers movable with said rotatable frame and engageable with said cam tracks, and means connecting said cam followers to said projections and means for transferring material from the compartment of a lower frame to the compartment of an adjacent upper frame whereby the material in said compartments is lifted in stages.

8. An elevator-conveyor comprising a relatively stationary frame, a plurality of rotatable frames rotatably mounted upon said stationary frame in substantially superimposed substantially tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the rotatable frame an arcuate compartment in which material to be elevated and conveyed is carried, projections carried by each rotatable frame and movable into said respective arcuate compartments to inhibit retrogressive movement of the material carried in said compartments comprising cam tracks mounted on said stationary frame eccentrically with respect to said rotatable frames, cam followers movable with said rotatable frame and engageable with said cam tracks, and means connecting said cam followers to said projections and means for transferring material from the compartment of a lower frame to the compartment of an adjacent upper frame whereby the material in said compartments is lifted in stages.

9. An elevator-conveyor comprising a relatively stationary frame, a plurality of substantially cylindrical rotatable frames rotatably mounted upon said stationary frame in substantially superimposed tangential relationship, means mounted upon said stationary frame for rotating adjacent rotatable frames in opposite directions, flexible endless belt means wrapped upon each rotatable frame on the upwardly moving side thereof and movable with said rotatable frames, each of said belt means being spaced radially from a portion of the periphery of a respective rotatable frame to provide with said portion of the frame an arcuate compartment in which material to be elevated and conveyed is carried, projecting members carried by each rotatable frame and movable radially into said respective arcuate compartments to inhibit retrogressive movement of the material carried in said compartments, means for radially moving said projecting members, and means for transferring material from the compartment of a lower frame to the compartment of an adjacent upper frame whereby the material in said compartments is lifted in stages.

10. An elevator-conveyor comprising a relatively stationary frame, a plurality of substantially cylindrical rotatable frames rotatably mounted upon said stationary frame in substantially superimposed tangential relationship, the peripheral portions of each of said rotatable frames comprising annular spaced side plates and an intervening drum plate which define a three sided arcuate compartment, means mounted upon said stationary frame for rotating adjacent rotatable frames in opposite directions, separate flexible endless belt means wrapped upon the annular spaced side plates of each rotatable frame on the upwardly moving side thereof and movable with said rotatable frames, each of said belt means being spaced radially from the drum plate of the respective rotatable frame to provide with said side plates and drum plates a closed arcuate compartment in which material to be elevated and conveyed is carried, blades carried by each rotatable frame and movable radially into said respective arcuate compartments to inhibit retrogressive movement of the material carried in said compartments, means for radially moving said blades, and means for transferring material from the compartment of a lower frame to the compartment of an adjacent upper frame whereby the material in said compartments is lifted in stages.

11. An elevator-conveyor comprising a relatively stationary frame, a plurality of substantially cylindrical rotatable frames rotatably mounted upon said stationary frame in substantially superimposed tangential relationship, the peripheral portions of each of said rotatable frames comprising annular spaced side plates and an intervening drum plate which define a three sided arcuate compartment, means mounted upon said stationary frame for rotating adjacent rotatable frames in opposite directions, separate flexible endless belt means wrapped upon the annular spaced side plates of each rotatable frame on the upwardly moving side thereof and movable with said rotatable frames, each of said belt means being spaced radially from the drum plate of the respective rotatable frame to provide with said side plates and drum plates a closed arcuate compartment in which material to be elevated and conveyed is carried, blades carried by each rotatable frame and movable radially into said respective arcuate compartments to inhibit retrogressive movement of the material carried in said compartments, means for radially moving said blades, and a transfer plate disposed adjacent the zone of tangency between said superimposed rotatable frames and bearing upon the drum plate of the lowermost rotatable frame for transferring material from the arcuate compartment of the lowermost rotatable frame to the arcuate compartment of the adjacent upper rotatable frame whereby the material in said compartments is lifted in stages.

References Cited in the file of this patent

UNITED STATES PATENTS

| 1,776,420 | Eichenberger | Sept. 23, 1930 |
| 1,919,275 | Dunham | July 25, 1933 |

FOREIGN PATENTS

| 415,776 | Germany | June 30, 1925 |